(12) United States Patent
Choi et al.

(10) Patent No.: US 11,422,434 B2
(45) Date of Patent: Aug. 23, 2022

(54) ELECTRONIC DEVICE INCLUDING A CAMERA SECURITY COVER

(71) Applicant: Samsung Electronics Co., Ltd., Gyeonggi-do (KR)

(72) Inventors: Myoungjun Choi, Gyeonggi-do (KR); Daesic Chae, Gyeonggi-do (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 17/270,931

(22) PCT Filed: Aug. 28, 2019

(86) PCT No.: PCT/KR2019/011013
§ 371 (c)(1),
(2) Date: Feb. 24, 2021

(87) PCT Pub. No.: WO2020/045989
PCT Pub. Date: Mar. 5, 2020

(65) Prior Publication Data
US 2021/0208480 A1    Jul. 8, 2021

(30) Foreign Application Priority Data

Aug. 29, 2018 (KR) .......................... 10-2018-0102096

(51) Int. Cl.
G03B 11/04    (2021.01)
G06F 1/16    (2006.01)
(52) U.S. Cl.
CPC .......... G03B 11/043 (2013.01); G06F 1/1686 (2013.01)

(58) Field of Classification Search
CPC .......................... G03B 11/043; G06F 1/1686
See application file for complete search history.

(56) References Cited

U.S. PATENT DOCUMENTS 3,922,690 A    11/1975 Nesson et al.
6,626,055 B2    9/2003 Magaribuchi
(Continued)

FOREIGN PATENT DOCUMENTS

CN    201348707 Y    * 11/2009
CN    201348707 Y    11/2009
(Continued)

Primary Examiner — Clayton E. LaBalle
Assistant Examiner — Diana Hancock
(74) Attorney, Agent, or Firm — Cha & Reiter, LLC

(57) ABSTRACT

An electronic device is disclosed. An electronic device according to an embodiment includes a housing including a glass plate and a rear case that is combined with the glass plate to form an inner space, a bezel, disposed on at least one edge of the glass plate, including a light passage hole, a camera module disposed in the inner space in which a center of the light passage hole and an optical axis of the lens of the camera module coincide each other and a cover member for opening and closing the light passage hole, wherein the cover member includes a sliding button which includes a rack gear on a first surface and capable of performing a linearly reciprocating movement and a pinion gear that rotates according to the movement of the rack gear, and wherein the pinion gear is disposed on at least a part of the circumference at a position corresponding to the teeth meshing with the rack gear and the light passage hole and includes an open area for transmitting an incident light through the light passage hole.

14 Claims, 10 Drawing Sheets

(56) References Cited

U.S. PATENT DOCUMENTS

| | | | |
|---|---|---|---|
| 8,553,144 B2 | 10/2013 | Han et al. | |
| 8,905,655 B1 * | 12/2014 | Hsu | G03B 11/043 396/448 |
| 2007/0274709 A1 * | 11/2007 | Ho | G03B 17/00 396/448 |
| 2010/0102979 A1 * | 4/2010 | Huang | G06F 1/1686 340/686.1 |
| 2018/0004068 A1 * | 1/2018 | Chen | G03B 11/041 |
| 2018/0314292 A1 | 11/2018 | Son | |
| 2021/0333686 A1 * | 10/2021 | Park | G03B 11/043 |

FOREIGN PATENT DOCUMENTS

| | | | | |
|---|---|---|---|---|
| CN | 104267783 A | | 1/2015 | |
| JP | 2009-47829 A | | 3/2009 | |
| KR | 10-0678039 B1 | | 2/2007 | |
| KR | 10-0927415 B1 | | 11/2009 | |
| KR | 100927415 B1 | * | 11/2009 | |
| KR | 10-2017-0045647 A | | 4/2017 | |
| WO | WO-2010087583 A2 | * | 8/2010 | G03B 11/043 |

\* cited by examiner

ELECTRONIC DEVICE INCLUDING A CAMERA SECURITY COVER

CROSS REFERENCE TO RELATED APPLICATIONS

This application is a National Phase Entry of PCT International Application No. PCT/KR2019/011013, which was filed on Aug. 28, 2019, and claims a priority to Korean Patent Application No. 10-2018-0102096, which was filed on Aug. 29, 2018, the contents of which are incorporated herein by reference.

TECHNICAL FIELD

Various embodiments relate to an electronic device including a camera security cover.

BACKGROUND ART

An electronic device includes a camera module. The electronic device including a camera module captures scenes or photographs materials while using the electronic device. In addition, with the development of the Internet of Things (IoT) and the development of communication, camera modules are increasingly used in home appliances as well as mobile devices.

The camera module attached to the electronic device may operate due to hacking of the electronic device without a user's unawareness of the operation of the camera module. The electronic device emits light when a Light Emitting Diode (LED) attached to the camera module is operated or provides a notification of the camera operation to the user.

DISCLOSURE OF INVENTION

Technical Problem

When the camera module is hacked, the LED of the camera module or the speaker of the camera module is frequently also be hacked. In this case, though a visual notification or an audible notification regarding the camera operation is provided to the user, the user does not aware of it.

Therefore, there is a need to prevent unintended photographing by preventing the camera lens of the camera module in the electronic device from being exposed to the outside even when the camera module is hacked.

Solution to Problem

An electronic device including a camera security cover according to an embodiment includes a housing including a glass plate and a rear case that is combined with the glass plate to form an inner space, a bezel disposed on at least one corner of the glass plate and including a light passage hole, a camera module disposed in the inner space in which a center of the light passage hole coincides with an optical axis of a lens, and a cover member for opening and closing the light passage hole wherein the cover member includes a sliding button including a rack gear on a first surface of the sliding button and performing a linearly reciprocating movement and a pinion gear that rotates according to the movement of the rack gear, and wherein the pinion gear includes teeth engaged with the rack gear on at least a part of a circumference of the pinion gear and an open area, disposed at a position corresponding to the light passage hole, for transmitting a light incident through the light passage hole.

An electronic device according to an embodiment includes a housing defining an inner space, a bezel formed in an edge region of the housing and including a light passage hole formed toward one surface of the housing, a camera module disposed in the inner space and having an optical axis coincident with a center of the light passage hole, a sliding button formed on a part of a side surface of the housing adjacent to one surface of the housing and including a rack gear formed toward an inner surface of the housing, and a shielding part including teeth engaged with the rack gear and rotatable wherein the shielding part includes an open area formed toward a rotational axis and disposed between the light passage hole and the camera module.

Advantageous Effects of Invention

The electronic device including the camera security cover according to an embodiment prevents the camera lens from being physically exposed to an outside even when the camera module is hacked, thereby preventing the camera module from operating without recognition of the user for operating the camera module.

According to another embodiment, by exposing the operation button of the camera security cover to the side portion of an electronic device, it is possible to prevent damage due to the input device or the case by blocking the camera security cover from contacting the input device or the case in the operation of opening or closing of the electronic device.

BEST MODE FOR CARRYING OUT THE INVENTION

Figure 1:
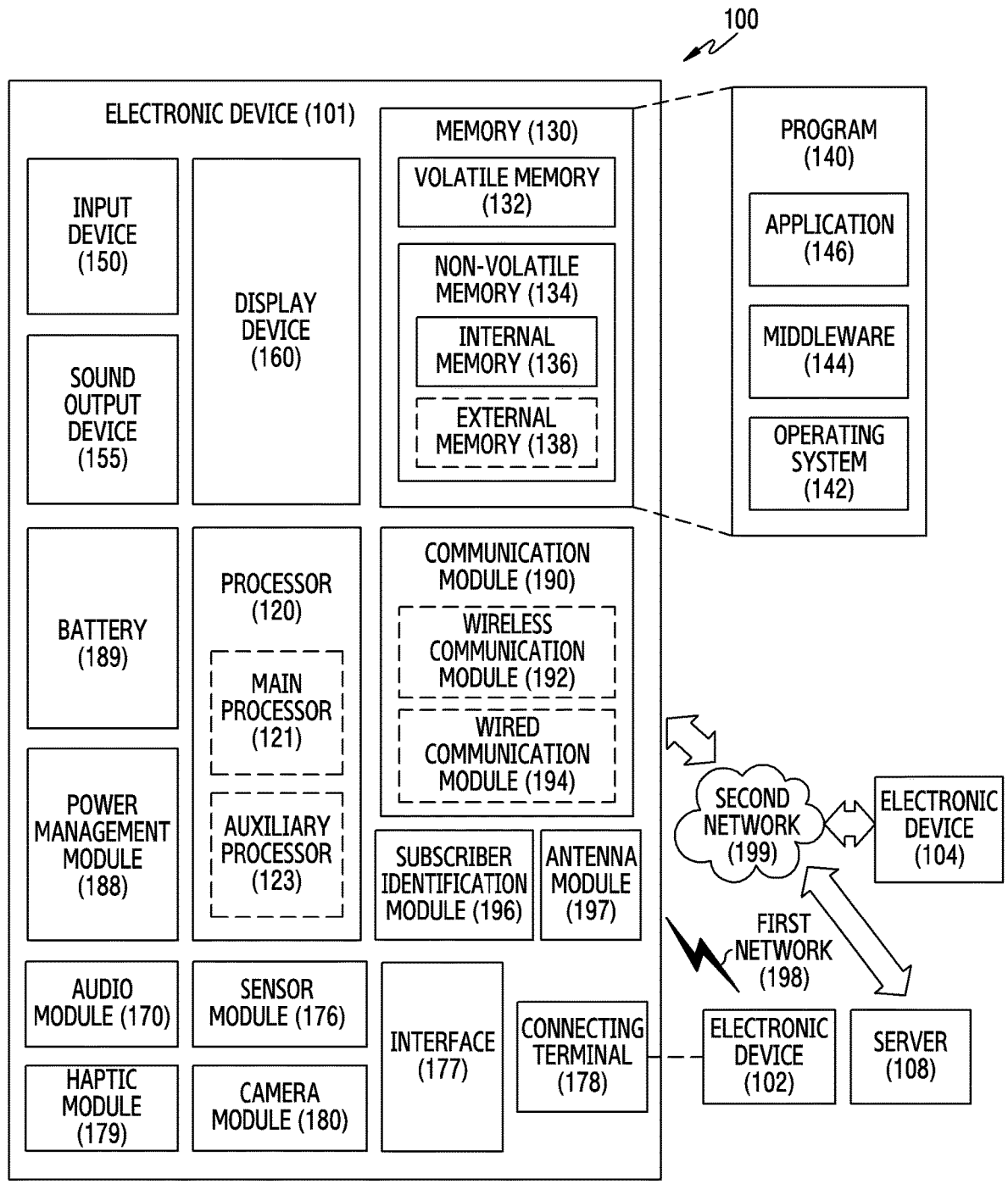
FIG. 1 is a block diagram of an electronic device according to various embodiments in a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. In the disclosure, expressions such as "1st", "2nd, "first or "second, etc. may modify various elements of the disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the disclosure, and similarly, the second element may be named as the first element.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element. As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
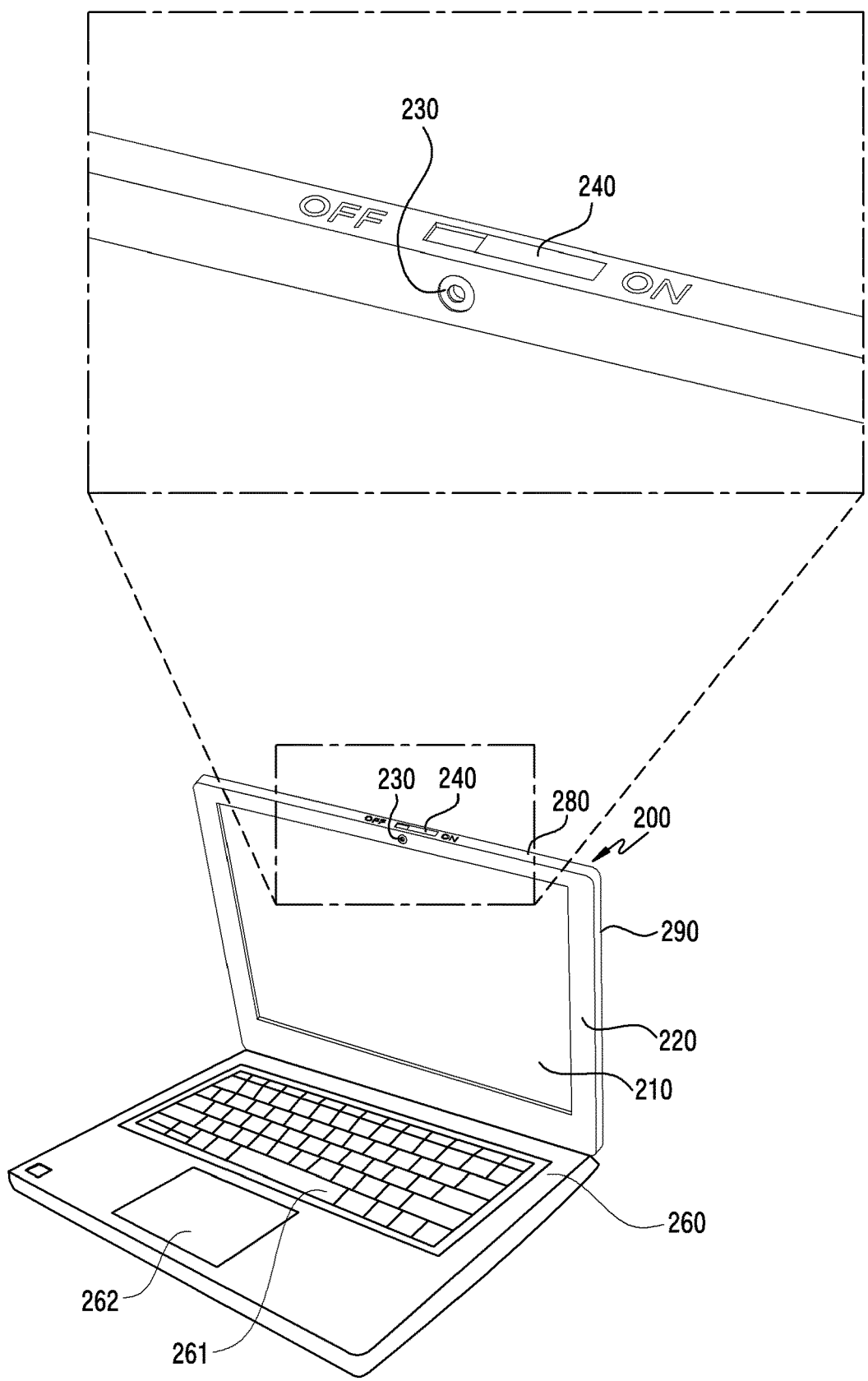
FIG. 2 is a perspective view of an electronic device according to an exemplary embodiment.

FIG. 2 is a perspective view of an electronic device according to an exemplary embodiment.

Referring to FIG. 2, the electronic device 200 includes a glass plate 210, a rear case 290, and a bezel 220.

According to an embodiment, the glass plate 210 is disposed facing a first direction. The glass plate 210 transmits at least one light displayed on the display panel (e.g. the display device 160 in FIG. 1). The glass plate 210 is made of a polymer material such as a polycarbonate (PC), a polymethyl methacrylate (PMMA), a polyimide (PE), a polyethylene terephthalate (PET), a polypropylene terephthalate, and a phthalate (polypropylene terephthalate, PPT), and/or a glass. According to an embodiment, the glass plate 210 includes a multilayer structure made of various materials.

According to various embodiments, the bezel 220 is formed at one corner, is formed at opposite corners, or is formed at the edge of the glass plate 210 in various forms. According to an embodiment, the bezel 220 forms a side surface 280 of the housing. In this case, the bezel 220 forms an inner space by separating the glass plate 210 from the rear case 290.

According to an embodiment, the bezel 220 exposes a lens of the camera module 230 (e.g. the camera module 180 in FIG. 1) in a first direction, and the cover member 240 is disposed in a side surface 280 which is adjacent of the camera module 230. The lens of the camera module 230 is exposed to the outside and receives an external light to take an image. The exposed button member of the cover member 240 moves along the side surface 280. When the button member of the cover member 240 moves to the designated area, the lens part of the camera module 230 is covered using a shielding part (screen).

According to various embodiments, the electronic device 200 further includes an input device 260. The input device 260 includes a keypad 261 and a touch pad 262 on one surface. Inside the input device 260, parts of the electronic device 200 such as a processor that controls the electronic device 200 (e.g., the processor 120 in FIG. 1) and a battery (e.g., the battery 189 in FIG. 1) are implemented.

According to various embodiments, the electronic device 200 includes a display capable of sensing a touch input. The input device 260 is a protective case of the electronic device 200. The input device 260 includes only the keypad 261 or only the touch pad 262. When the electronic device 200 is not used, the input device 260 covers the front (glass) plate 210 to protect the electronic device 200.

The glass plate 210 contacts the input device 260 of the electronic device 200. When the cover member 240 is exposed in the direction to which the glass plate 210 is located, the cover member 240 is likely to be damaged due to a contact with the input device 260, but in the electronic device 200 according to an embodiment the cover member is disposed on the side surface 280 to avoid contact with the glass plate 210.

Figure 3:
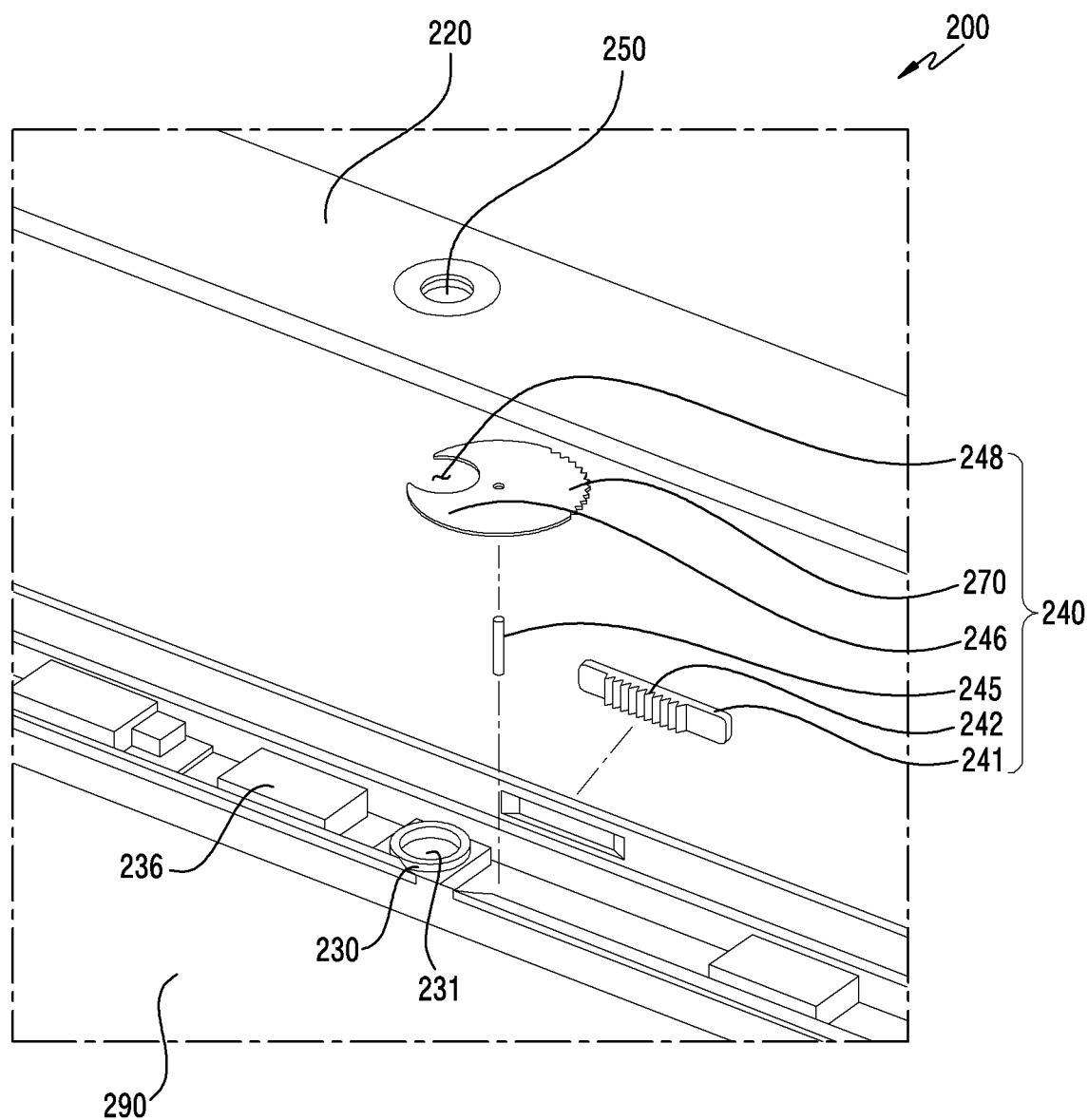
FIG. 3 is an exploded perspective view of an electronic device according to an exemplary embodiment.

FIG. 3 is an exploded perspective view of an electronic device according to an exemplary embodiment.

Referring to FIG. 3, the bezel 220 includes a light passage hole 250. The light passage hole 250 transmits a light to a lens part 231 of the camera module 230. The image captured by the camera module 230 is processed by a processor (e.g., the processor 120 in FIG. 1) and displayed through the display (e.g., the display 160 in FIG. 1). The camera module 230 is attached to the printed circuit board 236 and receives a power from a battery (e.g. the battery 189 in FIG. 1), and provides data or signals to the processor 120 or other electronic components.

According to an embodiment, the cover member 240 includes a pinion gear 246 serving as a shielding part (a shielding screen) and a sliding button 241 performing a linear movement. When the sliding button 241 disposed on the side surface 280 performs a linear reciprocating movement along the longitudinal direction, the pinion gear 246 performs a rotating movement. The pinion gear 246 includes teeth 247 along a part of the circumference and an open area 248 in a recessed form toward the center. The teeth 247 and the open area 248 spaced apart each other with the center of the pinion gear therebetween. The center of the circumference of the pinion gear 246 is connected to a rotation shaft 245 and thus, the pinion gear rotates accordingly. According to various embodiments, the lens part 231 of the camera module 230 is covered by the pinion gear 246 as the pinion gear 246 rotates, and the open area 248 and the light passage hole 250 are arranged to overlap so that the lens part 231 is exposed to the outside.

According to various embodiments, the open area 248 of the pinion gear 246 is formed as an opening penetrating the pinion gear 246. The opening is equal to or larger than the size of the light passage hole 250. The rotation of the pinion gear 246 having the opening blocks the light passage hole 250 to isolate the lens of the camera module 230 from the outside when the light passage hole 250 and the opening do not coincide each other, and when the light passage hole 250 and the opening coincide each other, the lens of the camera module 230 is exposed to the outside.

Figure 4:
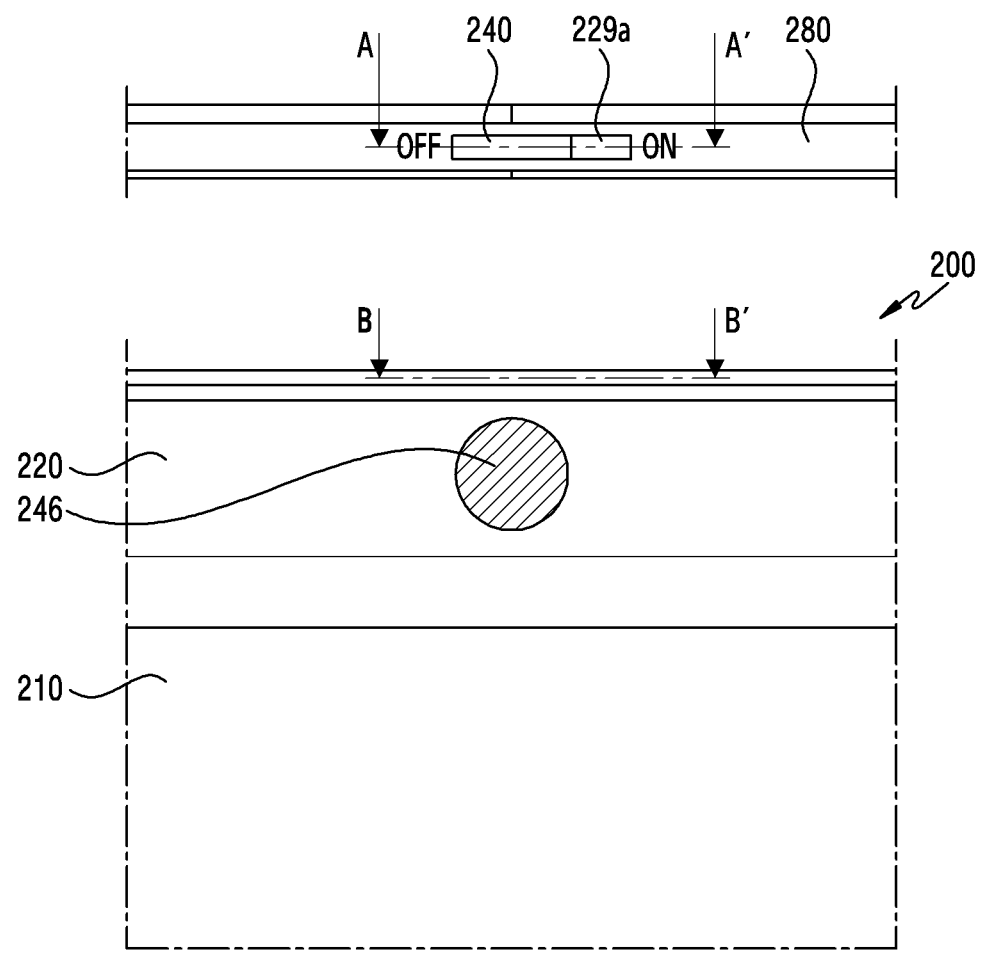
FIG. 4 is a plan view and a front view illustrating a first operation of an electronic device according to an exemplary embodiment.
Figure 5A:
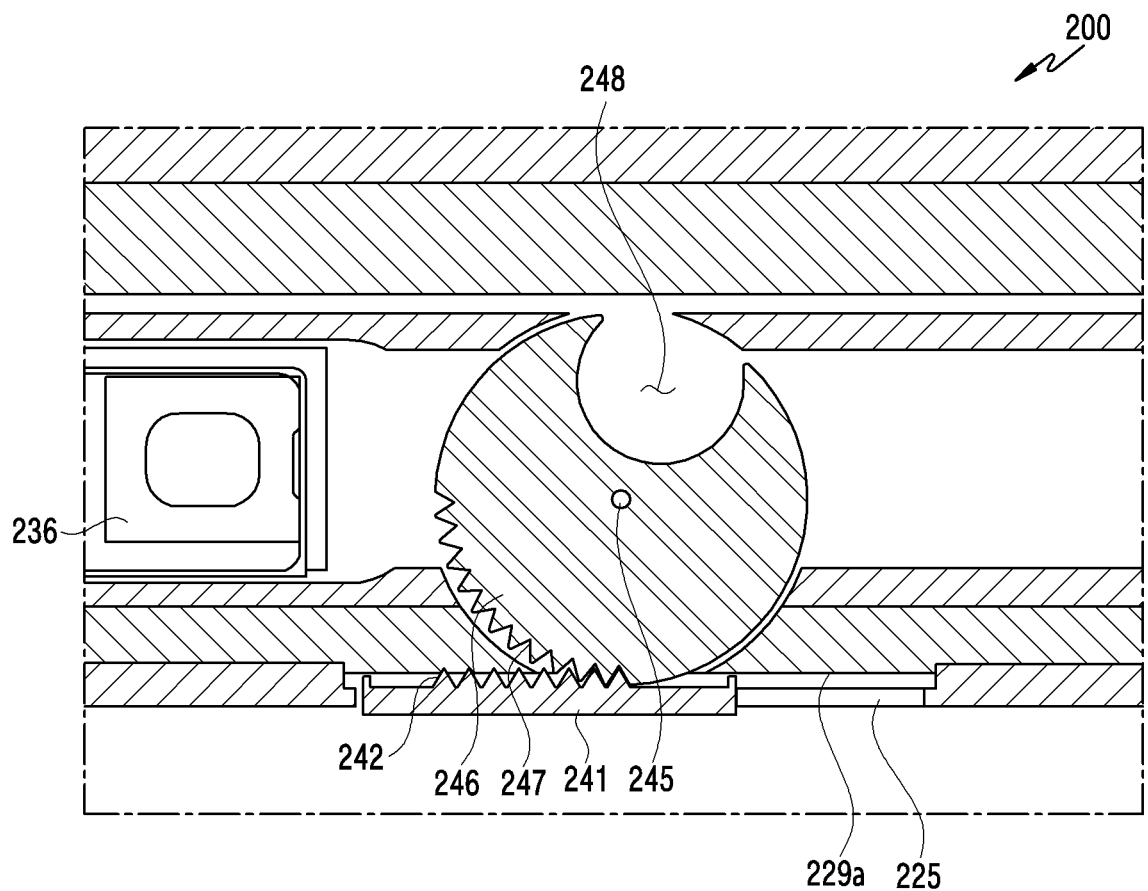
FIG. 5A is a cross-sectional view taken along line A-A' of the electronic device of FIG. 4, according to an exemplary embodiment.
Figure 5B:
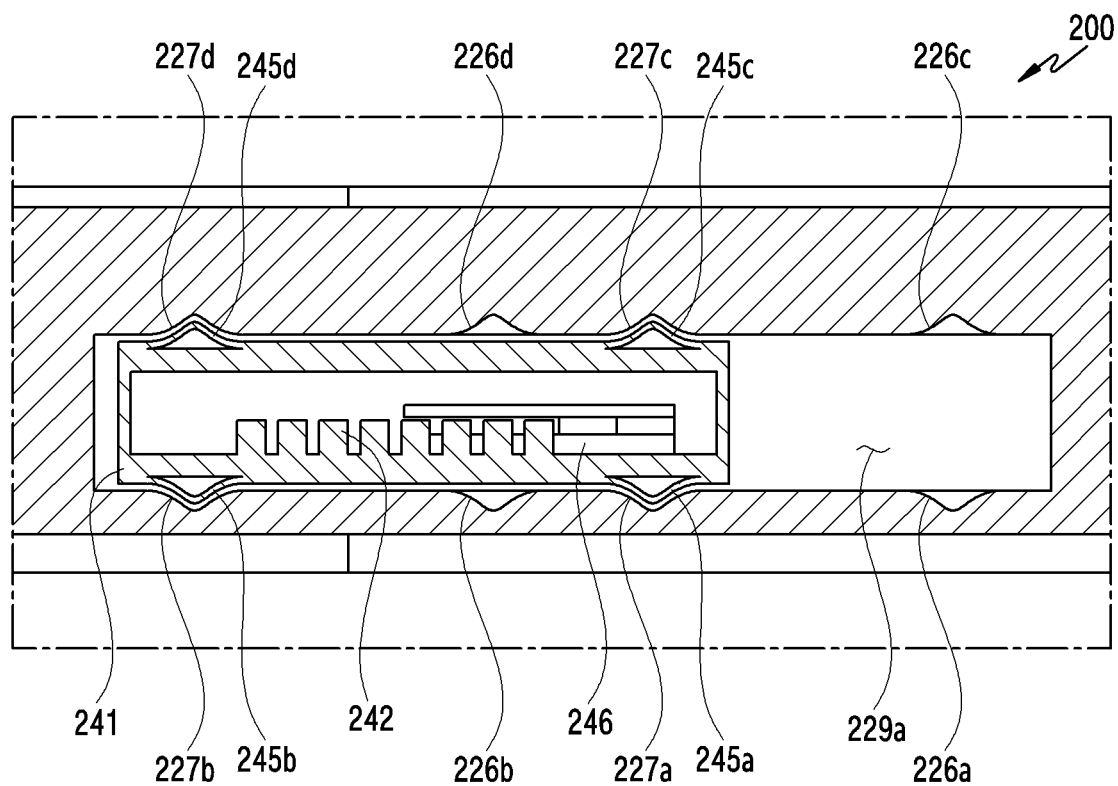
FIG. 5B is a cross-sectional view taken along line B-B' of the electronic device of FIG. 4, according to an exemplary embodiment.

FIG. 4 is a plan view and a front view illustrating a first operation of the electronic device according to an embodiment. FIG. 5A is a cross-sectional view taken along line A-A' of the electronic device of FIG. 4 according to an exemplary embodiment. FIG. 5B is a cross-sectional view taken along line B-B' of the electronic device of FIG. 4, according to an exemplary embodiment.

Referring to FIG. 4, the light passage hole 250 in the bezel 220 is covered by the pinion gear 246. According to an embodiment, when the sliding button 241 moves to the OFF area, the light passage hole 250 is covered by the pinion gear 246.

According to an embodiment, the guide groove 225 in the first region 229a has the same color with the bezel 220 and the side surface 280, indicating that the lens of the camera module 230 is not exposed. According to various embodiments, the color of the guide groove 225 in the first region 229a is formed differently from the color of the bezel 220 and the side surface 280. The user recognizes whether the camera module is used according to the exposed color of the guide groove 225.

According to an embodiment, the color of the pinion gear 246 is formed differently from the color of the bezel 220, so that the user visually recognizes by the color of the pinion gear 246 exposed through the light passage hole 250 that the lens of the camera is not exposed.

Referring to FIGS. 5A and 5B, the cover member 240 includes a sliding button 241 with a rack gear 242. The sliding button 241 performs a linear movement along the guide groove 225. The cover member 240 forms the rack gear 242 on the side opposite to the flat surface of the sliding button 241.

According to an embodiment, the pinion gear 246 is coupled to the rotation shaft 245 formed on the bezel 220 or the rear case 290. The rack gear 242 meshes with the teeth 247 of the pinion gear 246, and by the movement of the rack gear 242, the pinion gear 246 rotates. The pinion gear 246 is disposed at a position to cover the light passage hole 250.

According to an embodiment, the camera module 230 is electrically connected to the printed circuit board 236. An image or a picture captured by the camera module 230 while being connected to the printed circuit board 236 is transmitted to the processor.

According to an embodiment, the cover member 240 includes a plurality of protrusions 245a, 245b, 245c, 245d formed on the side surface of a long edge. The protrusions 245a, 245b, 245c, 245d have elasticity and is deformed to have the same surface with the side surface of the cover member 240. Inside of the side surface where the protrusions 245a, 245b, 245c, 245d are located includes an empty space so that the protrusions 245a, 245b, 245c, 245d have elasticity.

According to an embodiment, the guide groove 225 forms first locking grooves 226a, 226b, 226c, 226d and second locking grooves 227a, 227b, 227c, 227d on the sidewall. According to an embodiment, the second locking grooves 227a, 227b, 227c, 227d engage with the protrusions 245a, 245b, 245c, 245d. While the sliding button 241 is moving, the sliding button slides without engaging with the first locking grooves 226a, 226b, 226c, 226d and the second locking grooves 227a, 227b, 227c, 227d. But when the movement of the sliding button 241 is complete, the sliding button 241 stops before the first locking groove 226a, 226b, 226c, 226d or the second locking groove 227a, 227b, 227c, 227d, and the user recognizes the opening or the closing of the light passage hole 250.

According to various embodiments, the protrusions 245a, 245b, 245c, 245d are hung in the second locking grooves 227a, 227b, 227c, 227d, and user recognizes that the cover member 240 closes the light passage hole 250.

Figure 6:
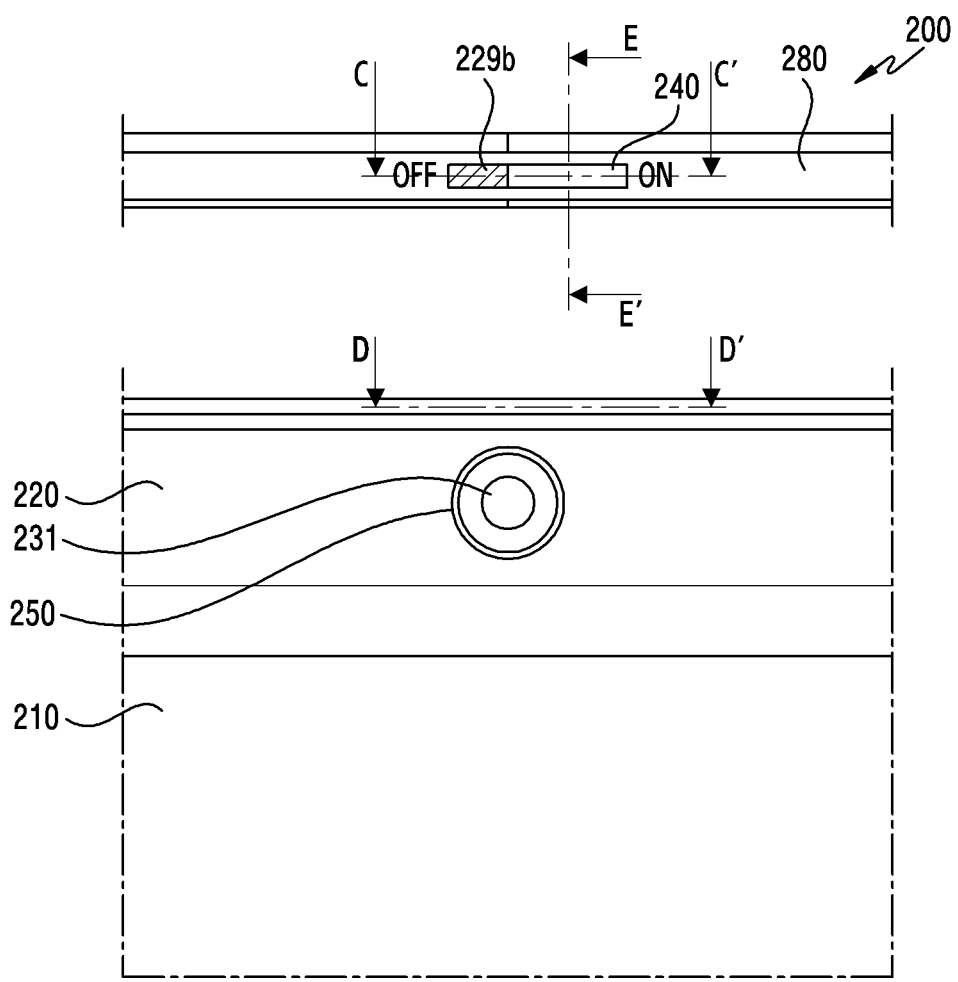
FIG. 6 is a plan view and a front view illustrating a second operation of an electronic device according to an exemplary embodiment.
Figure 7A:
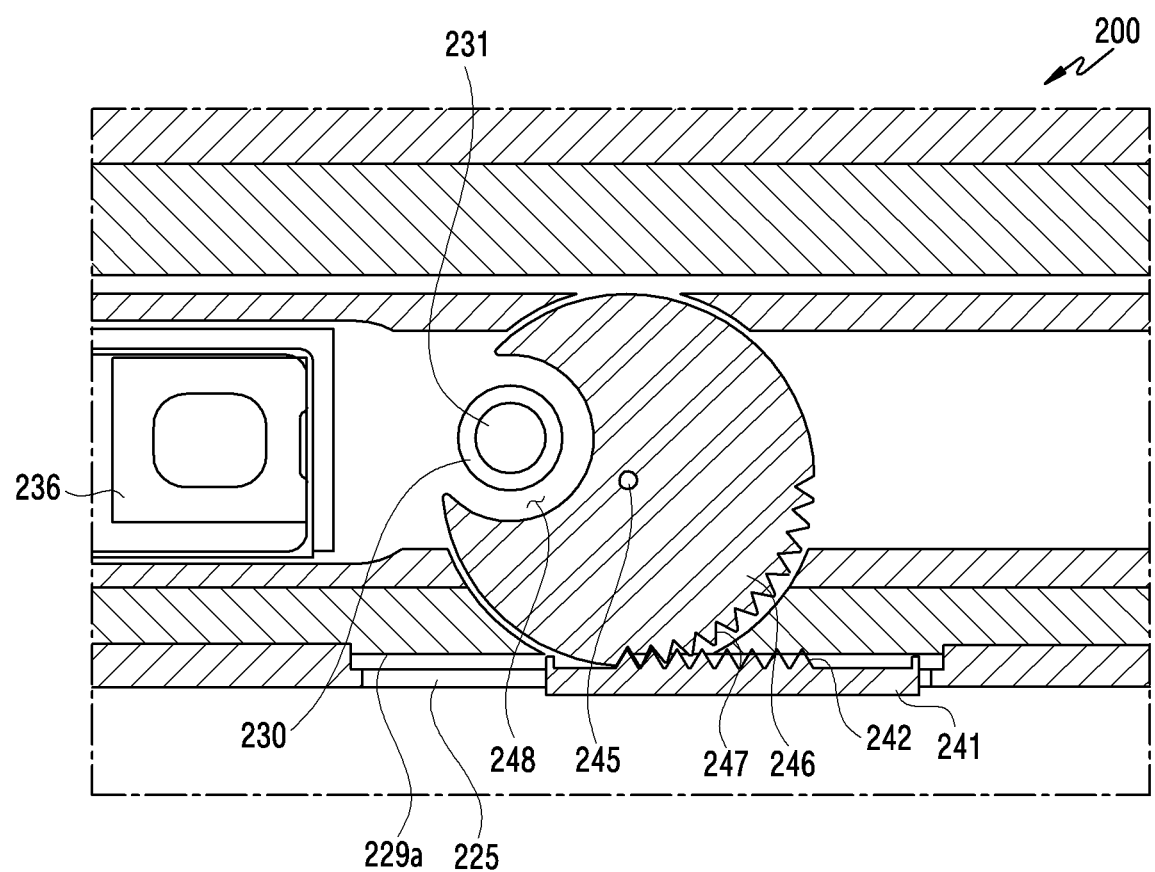
FIG. 7A is a cross-sectional view taken along line C-C' of the electronic device of FIG. 6, according to an exemplary embodiment.
Figure 7B:
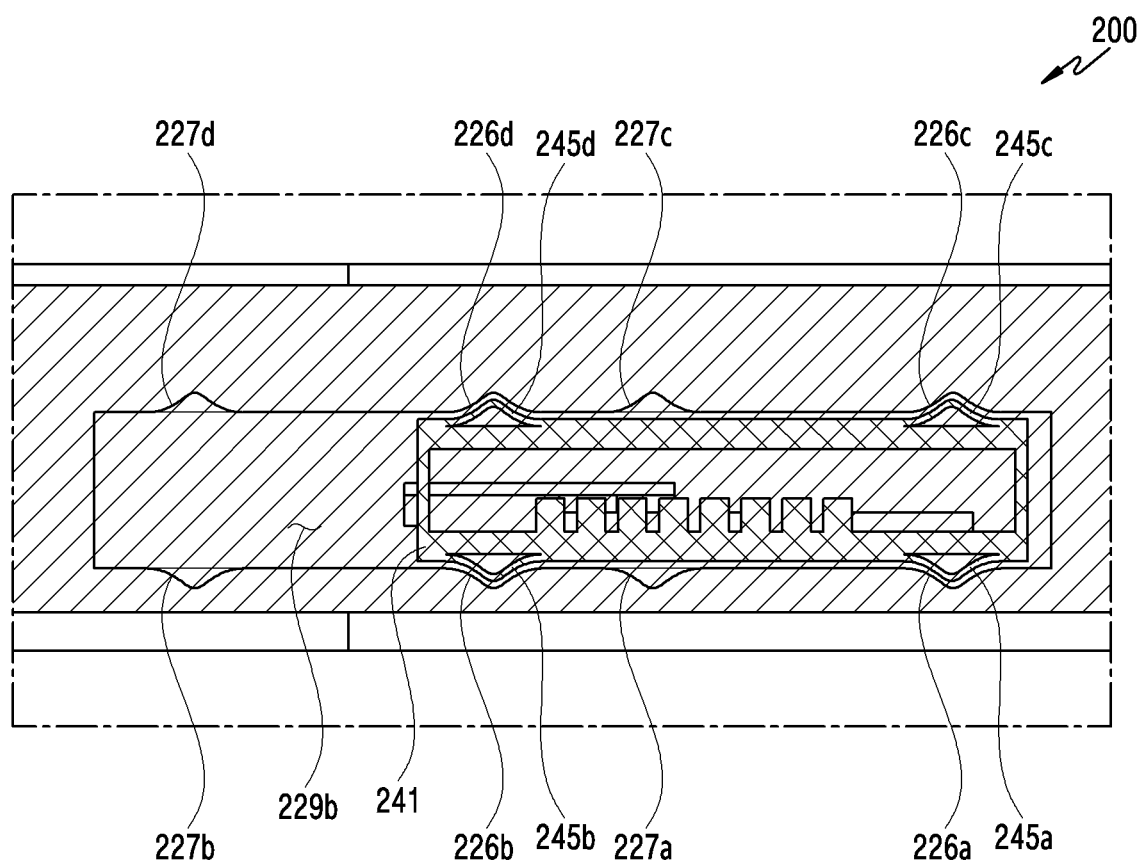
FIG. 7B is a cross-sectional view taken along line D-D' of the electronic device of FIG. 6, according to an exemplary embodiment.
Figure 7C:
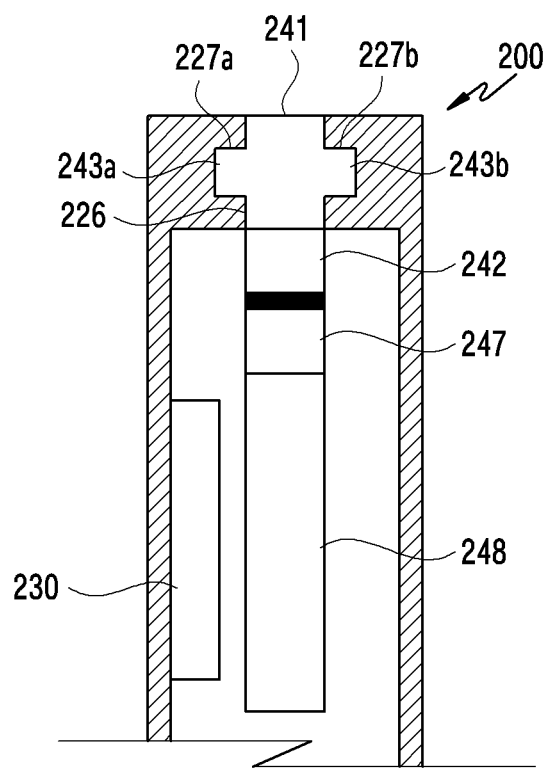
FIG. 7C is a cross-sectional view taken along E-E' of the electronic device of FIG. 6, according to an exemplary embodiment.

FIG. 6 is a plan view and a front view illustrating a second operation of the electronic device according to an embodiment. FIG. 7A is a cross-sectional view taken along line C-C' of the electronic device of FIG. 6 according to an embodiment. FIG. 7B is a cross-sectional view taken along D-D' of the electronic device of FIG. 6 according to an embodiment. FIG. 7C is a cross-sectional view taken along E-E' of the electronic device of FIG. 6 according to an embodiment.

Referring to FIG. 6, the light passage hole 250 in the bezel 220 is opened to expose the lens part 231. According to an embodiment, when the sliding button 241 moves to the ON area, the light passage hole 250 is opened by the open area 248 of the pinion gear 246.

According to an embodiment, the guide groove 225 in the second region 229b displaying different colors from the color of the bezel 220 and the side surface indicates that the lens of the camera module 230 is exposed. According to various embodiments, the guide groove 225 in the second region 229b displaying the same color with the color of the bezel 220 and the side surface 280 have the same color to indicate a different situation. The user recognizes whether the use of the camera module is available or not according to the exposed color of the guide groove 225.

According to an embodiment, the user visually recognizes whether the camera is exposed or not through the lens part exposed through the light passage hole 250. According to various embodiments, the exposed color of the pinion gear 246 when the light passage 250 is closed and the exposed color of the lens part 231 when the light passage 250 is open are different, and accordingly, the user easily recognizes whether or not the camera module 230 is used.

Referring to 7A and 7B, the cover member 240 includes the sliding button 241 with the rack gear 242. The sliding button 241 performs a linear movement along the guide groove 225. The cover member 240 forms the rack gear 242 on the opposite side to the flat surface of the sliding button 241.

According to an embodiment, the rack gear 242 meshes with the teeth 247 of the pinion gear 246. By the movement of the rack gear 242, the pinion gear 246 rotates. The pinion gear 246 opens the light passage hole 250. The open area 248 of the pinion gear 246, the lens part 231, and the light passage hole 250 are disposed coaxially, and therefore, the lens part 231 is exposed to the outside of the electronic device 200.

According to an embodiment, the camera module 230 is electrically connected to the printed circuit board 236. The camera module 230 records an image or a picture using the lens part 231 for receiving the light incident from the light passage hole 250. The camera module 230 is connected to the printed circuit board 236 and transmits the recorded image or picture to the processor.

According to an embodiment, the first locking grooves 226a, 226b, 226c, 226d are engaged with the protrusions 245a, 245b, 245c, 245d. While the sliding button 241 is moving, the sliding button 241 slides without engaging with the first locking grooves 226a, 226b, 226c, 226d and the second locking grooves 227a, 227b, 227c, 227d. But when the movement of the sliding button 241 is complete, the sliding button 241 stops by engaging with the first locking groove 226a, 226b, 226c, 226d or the second locking groove 227a, 227b, 227c, 227d, and accordingly the user recognizes the opening of the light passage hole 250 or the closing of the light passage hole 250.

According to various embodiments, the protrusions 245a, 245b, 245c, 245d are hung in the first locking grooves 226a, 226b, 226c, 226d, and the user recognizes that the light passage hole 250 is open.

Referring to FIG. 7C, the cover member 240 is fastened to the guide groove 225. The cover member 240 includes stepped portions 243a and 243b having a different height from the height of sliding button 241 and extending from the side surface. According to an embodiment, the guide groove 225 includes departure prevention parts 228a, 228b extending from the upper end of the side surface and covering the stepped portions 243a and 243b. Departure prevention parts 228a, 228b prevents the sliding button 241 of the cover member 240 from being separated, and the teeth 247 of the pinion gear 246 is engaged with the rack gear 242 by fixing the height even when the cover member 240 is moved. According to an embodiment, the circumference of the pinion gear 246 and the camera module 230 are disposed to overlap, and the camera module 230 is exposed to the outside of the electronic device by rotation of the pinion gear 246 to obtain an image. If necessary, the camera module 230 is physically blocked from the outside.

According to various embodiments, the lens part 231 of the camera module 230 of the electronic device 200 is opened or closed according to a user's need. When the camera module 230 is required, the sliding button 241 is moved to a position in which the lens part 231 is opened. When the sliding button 241 moves, the rack gear 242 formed on the first surface of the sliding button 241 moves. In conjunction with the movement of the rack gear 242, the pinion gear 246 rotates. When the open area 248 and the light passage hole 250 are overlapped by the rotational motion of the pinion gear 246, the lens part 231 is exposed to the outside.

According to various implementations, when the camera module 230 is not used, the sliding button 241 is moved to a position to close the lens part 231. When the sliding button 241 moves, the rack gear 242 formed on the first surface of the sliding button 241 moves. In conjunction with the movement of the rack gear 242, the pinion gear 246 performs a rotational movement. When the surface of the pinion gear 246 and non-open area of the light passage hole 250 are overlapped by the rotational motion of the pinion gear 246, the lens part 231 is prevented from being exposed to the outside.

The various embodiments described above are examples of the electronic device 200, and have been described as the device such as a mobile device and a notebook. But the embodiments are also applicable to an electronic device requiring a camera and is connected to a network such as a device including a display equipped with a camera module and a robot cleaner, etc.

An electronic device according to various embodiments as described above comprises a housing including a glass plate (e.g. the glass plate 210 in FIG. 2), and a rear case (e.g. the rear case 290 of FIG. 2) that forms an internal space by being combined with the glass plate, a bezel (e.g. the bezel 220 in FIG. 3) disposed at least one corner of the glass plate and including a light passage hole, a camera module (e.g. the camera module 230 in FIG. 3) disposed in the internal space wherein the center of the light passage hole and the optical axis of the lens match, and a cover member (e.g. the cover member 240 in FIG. 3) that opens and closes the light passage hole wherein the cover member includes a sliding button (e.g. the sliding button 241 in FIG. 3) capable of linearly reciprocating with a rack gear (e.g. the rack gear 242 in FIG. 3) on the first surface, and a pinion gear (e.g. pinion gear 246 in FIG. 3) that rotates according to movement of the rack gear wherein the pinion gear includes teeth (e.g. teeth 247 in FIG. 3) meshing with the rack gear on at least a part of a circumference and an open area (e.g. an open area 248 in FIG. 3) disposed at a position corresponding to the light passage hole and transmitting a light incident through the light passage hole.

According to an embodiment, the pinion gear is disposed between the camera module and the light passage hole.

According to an embodiment, the sliding button includes a second surface facing the first surface, and the second surface is exposed through a side surface of the rear case.

According to an embodiment, the side surface of the rear case includes a guide groove (e.g. a guide groove 225 in FIG. 5B) for guiding the linear reciprocating movement of the sliding button.

According to an embodiment, the guide groove forms an opening through which the rack gear moves.

According to an embodiment, the sliding button forms a bar shape, and a side surface of the sliding button includes a protrusion formed on a surface extending in a longitudinal direction.

According to an embodiment, the guide groove includes at least one locking groove corresponding to a protrusion of the sliding button.

According to an embodiment, when the sliding button is positioned at a first position of the guide groove, the open area of the pinion gear is disposed at a position corresponding to the light passage hole.

According to an embodiment, when the sliding button slides along the guide groove and is positioned at a second position of the guide groove, the pinion gear rotates according to the movement of the rack gear of the sliding button, and the light passage hole is obscured by the pinion gear.

According to an embodiment, the guide groove includes a first area and a second area having different colors each other, and when the sliding button is positioned at a first position of the guide groove, the first area of the guide groove is exposed and when the sliding button is positioned at the second position of the guide groove, the second area of the guide groove is exposed.

According to an embodiment, the pinion gear rotates by being coupled with a rotation shaft at a center of a circle formed along the outer circumference of the pinion gear, and the rotation shaft is integrally formed with the bezel or the rear case.

According to an embodiment, the teeth face the open area with the center of the circle of the pinion gear therebetween.

According to an embodiment, the guide groove includes a departure prevention part (e.g. departure prevention part 228a and 228b in FIG. 8) extending to partially cover a long edge area of the sliding button.

According to an embodiment, the sliding button includes stepped portions (e.g. stepped portions 243a and 243b in FIG. 8) extending differently in height from a side surface including a long edge.

According to an embodiment, the stepped portion is disposed under the departure prevention part, and the sliding button linearly moves along the longitudinal direction of the side member by the guide of the guide groove.

According to an embodiment, the open area is an area dug toward the center of the pinion gear.

According to an embodiment, the open area is an opening formed in the pinion gear.

An electronic device (e.g. the electronic device 200 in FIG. 2) according to various embodiments includes a housing forming an inner space, a bezel (e.g. the bezel 220 in FIG. 2) formed in an edge region of the housing and including a light passage hole formed toward one surface of the housing, a camera module (e.g. a camera module 230) disposed in the inner space wherein the center of the light passage hole and the optical axis of the lens coincide, a sliding button (e.g. sliding button 241 in FIG. 3) including a rack gear (e.g. rack gear 242 in FIG. 3) formed on a portion of the side surface adjacent to the one surface of the housing, reciprocally movable and formed toward the inner surface of the housing and a shielding part (e.g. pinion gear 246 in FIG. 3) including a tooth (e.g. teeth 247 in FIG. 3) meshing with the rack gear and being rotatable wherein the shielding part includes an open area dug toward the axis of rotation and is disposed between the light passage hole and the camera module.

According to an exemplary embodiment, the open area is disposed between the light passage hole and the camera module to open a lens (e.g. the lens part 231 in FIG. 3) of the camera module.

According to an embodiment, the side surface includes a guide groove (e.g. a guide groove 225 in FIG. 5B) guiding the movement of the sliding button.

In the above described specific embodiments of the present disclosure, components included in the disclosure are expressed in the singular or plural according to the presented specific embodiments. However, the singular or plural expression is selected appropriately for the situation presented for convenience of description, and the present disclosure is not limited to the singular or plural constituent elements. And even constituent elements expressed in plural may be composed of the singular or even the constituent elements expressed in singular may be composed of plural.

Meanwhile, although specific embodiments have been described in the detailed description of the present disclosure, various modifications may be made within the scope of the present disclosure. Therefore, the scope of the present disclosure should not be limited to the described embodiments, and should be determined by the scope of the claims to be described later and equivalents as well.

The invention claimed is:

1. An electronic device, comprising:
a housing including a glass plate and a rear case coupled with the glass plate to form an inner space;
a bezel disposed on at least one corner of the glass plate and including a light passage hole;
a camera module, disposed in the inner space, in which an optical axis of a lens of the camera module and a center of the light passage hole coincide with each other; and
a cover member for opening and closing the light passage hole,
wherein the cover member includes a sliding button including a rack gear on a first surface of the sliding button and moving in a linear reciprocating movement, and a pinion gear rotating according to the movement of the rack gear,
wherein the pinion gear includes teeth engaged with the rack gear on at least a part of a circumference of the pinion gear and an open area, disposed at a position corresponding to the light passage hole, for transmitting a light incident through the light passage hole, and
wherein the sliding button forms a bar shape, and a side surface of the sliding button includes a protrusion formed on a surface extending in a longitudinal direction.

2. The electronic device of claim 1, wherein the pinion gear is disposed between the camera module and the light passage hole.

3. The electronic device of claim 1, wherein the sliding button includes a second surface facing the first surface, and the second surface is exposed through a side surface of the housing.

4. The electronic device of claim 3, wherein the side surface of the housing includes a guide groove for guiding a linear reciprocating movement of the sliding button.

5. The electronic device of claim 4, wherein the guide groove forms an opening through which the rack gear moves.

6. The electronic device of claim 4, wherein the guide groove includes at least one locking groove corresponding to the protrusion of the sliding button.

7. The electronic device of claim 4, wherein the guide groove includes a departure prevention part extending to partially cover a long edge region of the sliding button.

8. The electronic device of claim 1, wherein the pinion gear rotates in combination with a rotating shaft at the center of a circle formed along an outer circumference of the pinion gear, and the rotating shaft is formed integrally with the bezel or the rear case.

9. The electronic device of claim 1, wherein the teeth face the open area with the center of a circle of the pinion gear therebetween.

10. The electronic device of claim 1, wherein the open area is an area dug toward the center of the pinion gear.

11. The electronic device of claim 1, wherein the open area is an opening formed in the pinion gear.

12. An electronic device, comprising:
- a housing forming an inner space;
- a bezel formed in an edge region of the housing and including a light passage hole formed toward one surface of the housing;
- a camera module disposed in the inner space wherein an optical axis of a lens of the camera module and a center of the light passage hole coincide with each other;
- a sliding button formed on a portion of a side surface of the housing adjacent to one surface of the housing and including a rack gear formed toward an inner space of the housing; and
- a shielding part including teeth meshing with the rack gear wherein the shielding part is rotatable,
- wherein the shielding part includes an open area formed toward a rotation axis, and is disposed between the light passage hole and the camera module, and
- wherein the sliding button forms a bar shape, and a side surface of the sliding button includes a protrusion formed on a surface extending in a longitudinal direction.

13. The electronic device of claim 12, wherein the open area is disposed between the light passage hole and the camera module to open the lens of the camera module.

14. The electronic device of claim 12, wherein the side surface of the housing includes a guide groove for guiding a movement of the sliding button.

\* \* \* \* \*